(12) United States Patent
Van Lieshout et al.

(10) Patent No.: US 10,779,158 B2
(45) Date of Patent: Sep. 15, 2020

(54) MOBILE DEVICE CAPABILITY IDENTIFIER

(71) Applicant: Samsung Electronics Co., Ltd., Suwon-si, Gyeonggi-do (KR)

(72) Inventors: Gert Jan Van Lieshout, Staines (GB); Himke Van der Velde, Staines (GB); Seonghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/763,377

(22) PCT Filed: Sep. 26, 2016

(86) PCT No.: PCT/KR2016/010790
§ 371 (c)(1),
(2) Date: Mar. 26, 2018

(87) PCT Pub. No.: WO2017/052346
PCT Pub. Date: Mar. 30, 2017

(65) Prior Publication Data
US 2019/0110190 A1     Apr. 11, 2019

(30) Foreign Application Priority Data

Sep. 25, 2015 (GB) .................................. 1516963.4

(51) Int. Cl.
*H04W 76/30* (2018.01)
*H04W 8/24* (2009.01)
(Continued)

(52) U.S. Cl.
CPC .............. *H04W 8/24* (2013.01); *G06F 21/44* (2013.01); *H04L 67/303* (2013.01); *H04W 4/50* (2018.02);
(Continued)

(58) Field of Classification Search
CPC ....... H04W 76/27; H04W 76/30; H04W 8/08; H04L 67/303
(Continued)

(56) References Cited

U.S. PATENT DOCUMENTS 7,260,623 B2 *  8/2007  Wookey .............. H04L 63/0428
                                                        370/465
7,986,642 B2 *  7/2011  Ishimoto ............... H04W 12/06
                                                        370/255
(Continued)

FOREIGN PATENT DOCUMENTS

CN          101001127 A     7/2007
CN          101179561 A     5/2008
WO          2015-051823 A1  4/2015

OTHER PUBLICATIONS

3GPP TS 36.331 V12.6.0 "3rd Generation Partnership Project; Technical Specification Group Radio Access Network; Evolved Universal Terrestrial Radio Access (E-UTRA); Radio Resource Control (RRC); Protocol specification (Release 12)", Jun. 30, 2015.
(Continued)

*Primary Examiner* — Phong La
(74) *Attorney, Agent, or Firm* — Jefferson IP Law, LLP

(57) ABSTRACT

A method for operating a mobile device in a mobile communication network. The method comprises transmitting a mobile device component identifier to a network node within the mobile communication network. The mobile device component identifier identifies at least one hardware or software component of the mobile device. The mobile device component identifier is indicative of capability information specifying at least one capability of the mobile device for communication with the mobile communication network. A corresponding method for operating a network node is also provided.

11 Claims, 9 Drawing Sheets

(51) Int. Cl.
  *H04L 29/08* (2006.01)
  *G06F 21/44* (2013.01)
  *H04W 4/50* (2018.01)
  *H04W 76/27* (2018.01)
  *H04W 8/08* (2009.01)

(52) U.S. Cl.
  CPC ............ *H04W 8/08* (2013.01); *H04W 76/27* (2018.02); *H04W 76/30* (2018.02)

(58) Field of Classification Search
  USPC .......................................................... 370/329
  See application file for complete search history.

(56) References Cited

U.S. PATENT DOCUMENTS

| | | | | |
|---|---|---|---|---|
| 8,805,367 | B2* | 8/2014 | Namba | H04L 1/1825 370/328 |
| 9,161,379 | B2* | 10/2015 | Seok | H04W 40/22 |
| 9,807,591 | B2* | 10/2017 | Sirotkin | H04L 5/0085 |
| 10,142,971 | B2* | 11/2018 | Hu | H04W 8/24 |
| 2007/0130326 | A1 | 6/2007 | Raphael et al. | |
| 2007/0130362 | A1* | 6/2007 | Oommen | H04L 12/189 709/238 |
| 2009/0170426 | A1* | 7/2009 | Jung | H04W 8/24 455/7 |
| 2012/0039312 | A1 | 2/2012 | Narkar et al. | |
| 2012/0064873 | A1 | 3/2012 | Farnsworth | |
| 2014/0098756 | A1* | 4/2014 | Tabatabaei Yazdi | H04W 76/10 370/329 |
| 2014/0169227 | A1 | 6/2014 | Ginde | |
| 2014/0169277 | A1 | 6/2014 | Mildh et al. | |
| 2014/0235258 | A1 | 8/2014 | Chen et al. | |
| 2014/0247785 | A1* | 9/2014 | Liu | H04W 72/0453 370/329 |
| 2015/0139166 | A1* | 5/2015 | Yao | H04L 67/00 370/329 |
| 2015/0256994 | A1* | 9/2015 | Liu | H04W 8/18 455/435.1 |
| 2016/0105784 | A1* | 4/2016 | Gellens | H04M 3/5116 455/404.1 |
| 2018/0270873 | A1* | 9/2018 | Cho | H04W 28/02 |
| 2019/0021085 | A1* | 1/2019 | Mochizuki | H04W 76/27 |
| 2019/0082376 | A1* | 3/2019 | Hong | H04W 48/02 |

OTHER PUBLICATIONS

3gpp Lte: "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0, pp. 253-256, XP055320339, Mar. 27, 2015.

Chinese Office Action dated Jul. 29, 2020, issued in Chinese Application No. 201680056061.7.

* cited by examiner

FIG. 3

UECapabilityEnquiry message

```
-- ASN1START

UECapabilityEnquiry ::=            SEQUENCE {
    rrc-TransactionIdentifier          RRC-TransactionIdentifier,
    CriticalExtensions                 CHOICE {
        c1                                 CHOICE {
            ueCapabilityEnquiry-r8             UECapabilityEnquiry-r8-IEs,
            spare3 NULL, spare2 NULL, spare1 NULL
        },
        CriticalExtensionsFuture           SEQUENCE {
    }
}

UECapabilityEnquiry-r8-IEs ::=     SEQUENCE {
    ue-CapabilityRequest               UE-CapabilityRequest,
    nonCriticalExtension               UECapabilityEnquiry-v8a0-IEs    OPTIONAL
}

UECapabilityEnquiry-v8a0-IEs ::= SEQUENCE {
    lateNonCriticalExtension           OCTET STRING                    OPTIONAL,
    nonCriticalExtension               UECapabilityEnquiry-v1180-IEs   OPTIONAL
}

UECapabilityEnquiry-v1180-IEs ::= SEQUENCE {
    requestedFrequencyBands-r11        SEQUENCE (SIZE (1..16)) OF FreqBandIndicator-r11
    OPTIONAL,
    nonCriticalExtension               UECapabilityEnquiry-vNxy-IEs    OPTIONAL
}

UECapabilityEnquiry-vNxy-IEs ::= SEQUENCE {
    -- Option 1: EUTRAN only configures whether or not UE reports UE part identifier
    reportUE-PartIdentifier-rN         ENUMERATED {true}       OPTIONAL, --Need ON
    -- Option 2: EUTRAN also configures what UE should include in legacy fields
    reportUE-PartIdentifier-rN         CHOICE {
        release                            NULL,
        setup                              SEQUENCE
            inLegacy                           ENUMERATED {none, upto2DL-1UL, spare2, spare1}
        }
    }                                  OPTIONAL, --Need ON
    nonCriticalExtension               SEQUENCE { }                    OPTIONAL
}                                      CSG-ProximityIndicationParameters-r9, UE-CapabilityRequest ::=           SEQUENCE (SIZE (1..maxRAT-Capabilities)) OF RAT-Type

-- ASN1STOP
```

FIG. 4

UECapabilityInformation message

```
-- ASN1START

UECapabilityInformation ::=           SEQUENCE {
    rrc-TransactionIdentifier             RRC-TransactionIdentifier,
    criticalExtensions                    CHOICE {
        c1                                    CHOICE {
            ueCapabilityInformation-r8            UECapabilityInformation-r8-IEs,
            spare7 NULL,
            spare6 NULL, spare5 NULL, spare4 NULL,
            spare3 NULL, spare2 NULL, spare1 NULL
        },
        CriticalExtensionsFuture              SEQUENCE {
    }
}

UECapabilityInformation-r8-IEs ::=    SEQUENCE {
    ue-CapabilityRAT-ContainerList        UE-CapabilityRAT-ContainerList,
    nonCriticalExtension                  UECapabilityInformation-v8a0-IEs    OPTIONAL
}

UECapabilityInformation-v8a0-IEs ::=  SEQUENCE {
    lateNonCriticalExtension              OCTET STRING                        OPTIONAL,
    nonCriticalExtension                  UECapabilityInformation-v1250-IEs   OPTIONAL
}

UECapabilityInformation-v1250-IEs ::= SEQUENCE {
    ue-RadioPagingInfo-r12                UE-RadioPagingInfo-r12              OPTIONAL,
    nonCriticalExtension                  SEQUENCE { }                        OPTIONAL
}

-- ASN1STOP
```

400 → ueCapabilityInformation-r8

FIG. 5A

UE-EUTRA-Capability Information element

```
-- ASN1START

UE-EUTRA-Capability ::=         SEQUENCE {
    accessStratumRelease            AccessStratumRelease,
    ue-Category                     INTEGER (1..5),
    PDCP-Parameters                 PDCP-Parameters,
    phyLayerParameters              phyLayerParameters,
    rf-Parameters                   RF-Parameters,
    measParameters                  MeasParameters
    featureGroupIndicators          BIT STRING (SIZE (32) )         OPTIONAL,
    interRAT-Parameters             SEQUENCE {
        utraFDD                         IRAT-ParametersUTRA-FDD         OPTIONAL,
        utraTDD128                      IRAT-ParametersUTRA-TDD128      OPTIONAL,
        utraTDD384                      IRAT-ParametersUTRA-TDD384      OPTIONAL,
        utraTDD768                      IRAT-ParametersUTRA-TDD768      OPTIONAL,
        geran                           IRAT-ParametersGERAN            OPTIONAL,
        cdma2000-HRPD                   IRAT-ParametersCDMA2000-HRPD    OPTIONAL,
        cdma2000-1xRTT                  IRAT-ParametersCDMA2000-1xRTT   OPTIONAL
    },
    nonCriticalExtension            UE-EUTRA-Capability-v920-IEs    OPTIONAL
}

-- Late non critical extensions
UE-EUTRA-Capability-v9a0-IEs ::=  SEQUENCE {
    featureGroupIndRel9Add-r9       BIT STRING (SIZE (32) )         OPTIONAL,
    fdd-Add-UE-EUTRA-Capabilities-r9    UE-EUTRA-CapabilityAddXDD-Mode-r9   OPTIONAL,
    tdd-Add-UE-EUTRA-Capabilities-r9    UE-EUTRA-CapabilityAddXDD-Mode-r9   OPTIONAL,
    nonCriticalExtension            UE-EUTRA-Capability-v9c0-IEs    OPTIONAL
}
<Irrelevant parts omitted)

-- Regular non critical extensions
UE-EUTRA-Capability-v920-IEs ::=  SEQUENCE {
    phyLayerParameters-v920             PhyLayerParameters-v920,
    interRAT-ParametersGERAN-v920           IRAT-ParametersGERAN-v920,
    interRAT-ParametersUTRA-v920            IRAT-ParametersUTRA-v920        OPTIONAL,
    interRAT-ParametersCDMA2000-v920        interRAT-ParametersCDMA2000-1XRTT-v920  OPTIONAL,
    deviceType-r9                           ENUMERATED {noBenFromBatConsumpOpt}     OPTIONAL,
    csg-ProximityIndicationParameters-r9    CSG-ProximityIndicationParameters-r9,
    neighCellSI-AcquisitionParameters-r9    NeighCellSI-AcquisitionParameters-r9,
    son-Parameters-r9                       SON-Parameters-r9,
    nonCriticalExtension                    UE-EUTRA-Capability-v940-IEs    OPTIONAL
}
```

MOBILE DEVICE CAPABILITY IDENTIFIER

TECHNICAL FIELD

The present invention relates to a method for reporting mobile device capabilities to a mobile communications network.

BACKGROUND ART

Wireless or mobile (cellular) communications networks in which a mobile device (also referred to as User Equipment, UE, such as a mobile handset) communicates via a radio link to a network of base stations or other wireless access points connected to a telecommunications network, have undergone rapid development through a number of generations. The initial deployment of systems using analogue signalling has been superseded by Second Generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems.

3GPP design, specify and standardise technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and Long-Term Evolution (LTE concerning the air interface). LTE uses an improved radio access technology known as Evolved UTRAN (E-UTRAN), which offers potentially greater capacity and additional features compared with previous standards. SAE provides an improved core network technology referred to as the Evolved Packet Core (EPC, also referred to as the Core Network, CN). Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 onwards. LTE Advanced is considered to be a 4G mobile communication system by the International Telecommunication Union (ITU).

Particular embodiments of the present invention may be implemented within an LTE mobile network (though the present invention may be considered to be applicable to many types of wireless communication network). Therefore, an overview of an LTE network is shown in FIG. 1. The LTE system comprises three high level components: at least one UE 102, the E-UTRAN 104 and the EPC 106. The EPC 106 communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces user data is represented by solid lines and signalling is represented by dashed lines.

The E-UTRAN 104 comprises a single type of component: an eNB (E-UTRAN Node B, also referred to as a base station) which is responsible for handling radio communications between the UE 102 and the EPC 106 across the air interface. An eNB controls UEs 102 in one or more cell. LTE is a cellular system in which the eNBs provide coverage over one or more cells. Typically there is a plurality of eNBs within an LTE system. In general, a UE in LTE communicates with one eNB through one cell at a time.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signalling messages exchanged with the UE 102 through the E-UTRAN 104. Each UE is registered with a single MME. There is no direct signalling pathway between the MME 114 and the UE 102 (communication with the UE 102 being across the air interface via the E-UTRAN 104). Signalling messages between the MME 114 and the UE 102 comprise EPS Session Management (ESM) protocol messages controlling the flow of data from the UE to the outside world and EPS Mobility Management (EMM) protocol messages controlling the rerouting of signalling and data flows when the UE 102 moves between eNBs within the E-UTRAN. The MME 114 exchanges signalling traffic with the S-GW 110 to assist with routing data traffic. The MME 114 also communicates with a Home Subscriber Server (HSS) 116 which stores information about users registered with the network.

It will be appreciated that there is a need for UEs to communicate their capabilities to the network in order for subsequent communication with the network to function correctly. Specifically, UEs must communicate their capabilities, and in particular their Radio Frequency, RF, capabilities, to the eNB. One particular type of capability information is known as the UE E-UTRA capabilities (also referred to as LTE capabilities—both terms are used synonymously in this document) which must be reported to the network and stored by the network to facilitate future communication across the air interface (referred to as the Uu interface) between the UE and the eNB. The UE E-UTRA capabilities are reported in a UECapabilityInformation message which may be transmitted at any time to the network—specifically the eNB—in response to a UECapabilityEnquiry message. This may include, but is not limited to, the transmission of the UE E-UTRA capabilities during a network attach procedure.

The UE E-UTRA capabilities form part of the Radio Resource Control (RRC) protocol specification as defined by 3GPP TS 36.331 v12.6.0 released on 8 Jul. 2015 and available from http://www.3gpp.org/dynareport/36331.htm. The RRC protocol specifies, amongst other things, functions and parameters of the radio interface between the UE and the E-UTRAN. In particular, section 6.3.6 specifies certain Information Elements (IEs) including the UE E-UTRA capability IE which is used to convey E-UTRA UE Radio Access Capability Parameters, according to 3GPP TS 36.306, and Feature Group Indicators for mandatory features that the UE supports (defined in Annexes B.1 and C.1) to the network. The IE UE-EUTRA-Capability is transferred from the UE to the network in E-UTRA (that is when the UE is connected to an LTE network) or when the UE is connected to networks operating according to other Radio Access Technologies (RATs). 3GPP TS 36.306 according to v12.5.0 released on 7 Aug. 2015, and available from http://www.3gpp.org/dynareport/36306.htm, defines the E-UTRA UE radio access capabilities. As one example, section 4.3.4.7 of TS 36.306 specifies a supportedMIMOCapabilityDL-r10 field which defines the maximum number of spatial multiplexing layers in the downlink direction for a certain band and bandwidth class in a supportedBandCombination supported by the UE and is communicated as part of the UE E-UTRA capabilities IE.

It has been observed that the size of the UE E-UTRA capabilities, and hence the amount of data that must be communicated across the Uu interface between the UE and the eNB and stored by the eNB is rapidly growing. This is largely due to UEs increasingly supporting the aggregation of carriers (Carrier Aggregation, CA). That is, where UEs support more than one carrier in downlink or uplink (or both), by communicating with the E-UTRAN through multiple cells, the amount of UE E-UTRA capability information that is needed by the eNB is increased significantly. It has been identified that some further mechanism (or extension of existing mechanisms) needs to be introduced to constrain the volume of UE E-UTRA capability information.

One proposed partial solution to this problem is that the UE shall provide UE E-UTRA capabilities for CA where there are band combinations for 5 bands or more (beyond 5 carriers, b5c) only in response to a request from the E-UTRAN. That is, where the UE supports combinations of carriers which in combination total 5 downlink carriers or more (for instance, 6 carriers in downlink and 2 carriers in uplink) then the relevant UE E-UTRA capability information is not provided without request combinations for carriers beyond 5. However, in the event that the information is requested, a significant volume of data must still be transferred and stored. At best, the problem has been delayed, or avoided only in certain circumstances. Clearly communication between the UE and the eNB using 5 carriers or more is not possible until the eNB has obtained this information.

Additionally, a further factor that drives the increase in UE E-UTRA capability information is the reporting mechanism which is selected whenever a new optional feature is introduced that requires reporting. In particular when a new optional feature is introduced, which concerns the physical layer, a decision must be made regarding what kind of UE capability signalling (forming part of the UE E-UTRA capability information) should be introduced. The UE capability signalling may comprise one of the following options: a single bit (per UE) indicating whether the UE supports the new optional feature regardless of the UE's configuration; a bit per frequency band, allowing the UE to indicate that it supports the new optional feature for some frequency bands but not for others (for instance, half duplex, 256 QAM in download); a bit per frequency band combination; or a bit per frequency band within a band combination. To determine the appropriate option requires a trade-off between flexibility and optimal use of UE capabilities versus complexity and signalling overhead. Consequently, UE capability signalling for new optional features is evaluated on a case by case basis. Clearly, however, the desire to preserve maximum flexibility directly conflicts with efforts to constrain the growth of UE E-UTRA capability information.

It has also been proposed that fall back combinations of UE E-UTRA capabilities be specified, which concern less demanding configurations that a UE supporting a given configuration would also need to support: for instance with one component carrier less. Such a fall back configuration may not need to be signalled (within UE E-UTRA capabilities), unless the UE can support, for instance, more Multiple Input, Multiple Output (MIMO) layers for such a configuration.

Furthermore, UE E-UTRA capabilities may be uploaded when the UE is connected to a network operating according to another RAT. This is done principally so that the UE E-UTRA capability information can be provided to the eNB upon handover to an LTE network. The recipient eNB can then use the capability information when setting the configuration to be used by the UE following handover. Currently it is mandatory for a Radio Network Controller (RNC) within some originating (non E-UTRA) networks (for instance, UMTS) to provide such capabilities upon handover to an LTE network. It has been proposed to allow the RNC to not provide any LTE capabilities during handover preparation from UMTS to LTE to avoid uploading the volume of LTE capability in UMTS as this may take considerable time and delay certain operations, for instance handover to LTE.

It is also known for the E-UTRAN, specifically the eNB, to limit the volume of LTE capabilities provided by the UE by requesting that the UE only provides information regarding specific bands (requested bands). In such a case, the UE still indicates all non-Carrier Aggregation (non-CA) bands as well as all 2 downlink and 1 uplink CA band combinations, which results in a reduction in the transmitted UE E-UTRAN capability information by prioritising the CA combinations requested. The band combinations beyond 2 downlink and 1 uplink are indicated only if all of the bands of those combinations are part of the bands requested by the network. It has been agreed in principle within 3GPP that the UE shall provide the band combinations beyond 5DL (B5C) only in response to a similar kind of network request.

DISCLOSURE OF INVENTION

Technical Problem

It has been observed that the size of the UE E-UTRA capabilities, and hence the amount of data that must be communicated across the Uu interface between the UE and the eNB and stored by the eNB is rapidly growing. This is largely due to UEs increasingly supporting the aggregation of carriers (Carrier Aggregation, CA). That is, where UEs support more than one carrier in downlink or uplink (or both), by communicating with the E-UTRAN through multiple cells, the amount of UE E-UTRA capability information that is needed by the eNB is increased significantly. It has been identified that some further mechanism (or extension of existing mechanisms) needs to be introduced to constrain the volume of UE E-UTRA capability information.

Solution to Problem

According to a first aspect of the present invention there is provided a method for operating a mobile device in a mobile communication network, the method comprising: transmitting a mobile device component identifier to a network node within the mobile communication network; wherein the mobile device component identifier identifies at least one hardware or software component of the mobile device; and wherein the mobile device component identifier is indicative of capability information specifying at least one capability of the mobile device for communication with the mobile communication network.

The method may further comprise: receiving a request from the network node for capability information; and providing to the network node confirmation that the mobile device supports the provision of a mobile device identifier in response to the request.

The method may further comprise: receiving from the network node a request for capability information including a request to receive a mobile device identifier; and providing the mobile device component identifier to the network node in response to receiving the request for a mobile device identifier.

The method may further comprise: receiving from the network node a request for capability information; and providing the mobile device component identifier to the network node in response to the request.

The method may further comprise: receiving a broadcast message from the network node indicating that the mobile device should provide a mobile device component identifier in response to a future request from the network node for capability information; receiving from the network node a request for capability information; and providing the mobile device component identifier to the network node in response to the request.

The mobile device may supply the mobile device component identifier to the network node during attachment to the mobile communication network.

The method may further comprise communicating with the network node to configure a wireless connection between the mobile device and the network node according to mobile device capability information indicated by the mobile device component identifier.

The mobile device component identifier may comprise a first subfield identifying a vendor associated with the hardware or software component of the mobile device or the mobile device itself and a second subfield identifying the particular hardware or software component of the mobile device.

The method may further comprise: transmitting, to the network node, along with the mobile device component identifier one of: no capability information indicated by the mobile device component identifier; a subset of the capability information indicated by the mobile device component identifier; capability information for carrier aggregation, CA, only for band combinations of less than a predetermined number of bands; or all of the capability information indicated by the mobile device component identifier. The subset of the capability information may comprise (sufficient) capability information to enable communication between the mobile device and the network node in the event that the mobile device component identifier is unknown to the network node. The predetermined number of bands could for instance be less than five bands or less than a certain number of downlink bands, for instance two.

The method may further comprise: receiving an indication from the network node regarding the proportion of capability information indicated by the mobile device component identifier to be transmitted to the network node along with the mobile device component identifier.

The method may further comprise: transmitting a second mobile device component identifier to the network node; wherein the second mobile device component identifier identifies at least one alternative hardware or software component of a mobile device; and wherein the second mobile device component identifier is indicative of capability information specifying at least one alternative capability of the mobile device different from that specified by capability information indicated by the first mobile device component identifier for communication with the mobile communication network.

According to a second aspect of the present invention there is provided a method for operating a network node in a mobile communication network, the method comprising: receiving from a mobile device a mobile device component identifier; and checking a stored database of mobile device component identifiers to determine if the mobile device component identifier is stored, and if so obtaining from the database capability information indicated by the mobile device component identifier specifying at least one capability of the mobile device for communication with the mobile communication network; wherein the mobile device component identifier identifies at least one hardware or software component of the mobile device.

The method may further comprise: transmitting to the mobile device a request for capability information; and receiving from the mobile device in response to the request: confirmation that the mobile device supports the provision of a mobile device identifier; or the mobile device component identifier.

The method may further comprise: transmitting to the mobile device a request for capability information including a request to receive a mobile device identifier; and receiving the mobile device component identifier from the mobile device in response to the request for a mobile device identifier.

The method may further comprise: transmitting a broadcast message indicating that mobile devices should provide a mobile device component identifier in response to a or any future request from the network node for capability information.

The method may further comprise: transmitting mobile device capability information including the mobile device component identifier to a core network node within the mobile communication network.

The method may further comprise: configuring a network connection between the mobile device and the network node on the basis of the capability information indicated by the mobile device component identifier.

If the stored database of mobile device component identifiers to determine does not include the received mobile device component identifier, the method may further comprise: configuring a network connection between the mobile device and the network node on the basis of additional capability information received from the mobile device; configuring a network connection between the mobile device and the network node on the basis of the capability information indicated by an additional mobile device component identifier received from the mobile device; requesting from the mobile device capability information corresponding to the mobile device component identifier; or requesting from a separate device capability information corresponding to the mobile device component identifier.

The method may further comprise: transmitting, to another network node, mobile device capability information received from the mobile device including the mobile device component identifier; or transmitting, to another network node, mobile device capability information received from the mobile device, the capability information having been modified by the substitution of capability information obtained from the database for the mobile device component identifier. The other network node may compromise a similar network node, for instance a second base station (eNB), a node within the core network (for instance, MME), or a node operating according to another RAT.

According to a third aspect of the present invention there is provided a mobile device in a mobile communication network, wherein the mobile device is arranged to implement the above method.

According to a fourth aspect of the present invention there is provided a network node in a mobile communication network, wherein the network node is arranged to implement the above method.

The network node may comprise a base station.

Another aspect of the invention provides a computer program comprising instructions arranged, when executed, to implement a method in accordance with any one of the above-described aspects. A further aspect provides machine-readable storage storing such a program.

Advantageous Effects of Invention

It has been proposed that upon handover from UMTS the eNB should be able to start the E-UTRA connection even without being provided with any UE capabilities. Correspondingly it is acceptable for inter RAT nodes to merely provide the UE component identifier. The eNB may temporarily, following connection establishment or handover, not use the full UE capabilities.

BRIEF DESCRIPTION OF DRAWINGS

FIG. 3 illustrates a UECapabilityEnquiry message according to an embodiment of the present invention;

FIG. 4 illustrates to a UECapabilityInformation message according to an embodiment of the present invention;

FIGS. 5a and 5b illustrates a UE-EUTRA-Capability IE according to an embodiment of the present invention;

MODE FOR THE INVENTION

Figure 1:
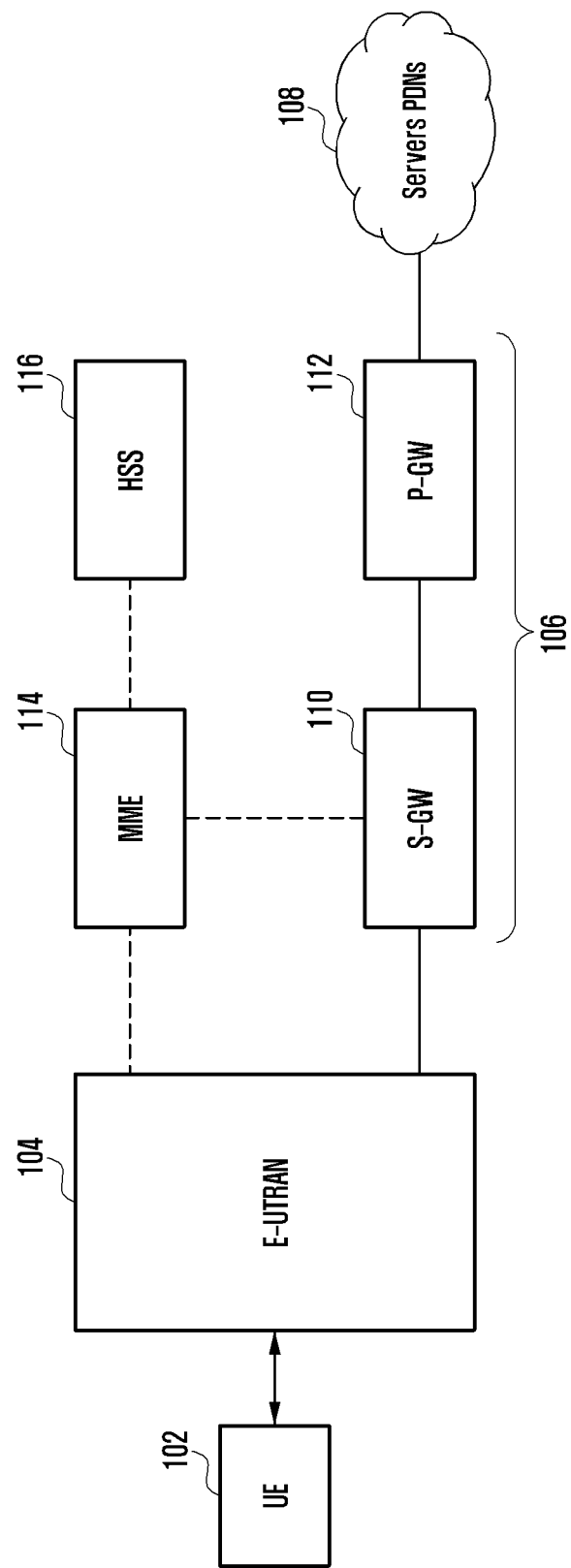
FIG. 1 schematically illustrates an overview of an LTE mobile communication network.

Embodiments of the present invention will now be described in the context of an LTE compliant mobile wireless communications network operating in accordance with the 3GPP LTE standards up to Release-12 and beyond—in particular with a view to Release-13. However, it will be understood that this is by way of example only and that other embodiments may involve other wireless networks, operating at least partially in compliance with other releases and standards.

The present inventors have recognized that a large portion (in terms of size) of the UE capabilities relate to RF hardware, or indeed any other hardware component of a UE that implies particular UE capabilities. More specifically, a substantial amount of UE capabilities are implied by the particulars of Radio Frequency (RF) hardware modules or chips. Furthermore, substantial amounts of UE capabilities are implied by particular software implementations within the UE, such as supported protocol stacks, which may frequently relate to particular hardware implementations. More generally stated, UE capabilities concern information about many different features that may or may not be supported by the UE and optionally further parameters defining abilities and limitations for those features. This may be implied by a component of the UE (whether hardware, software or a combination of both and any number of components). Accordingly, the present inventors propose that the eNB stores the detailed capabilities associated with particular UE components or combinations of components such as hardware modules/chips or more generally particular hardware and/or software implementations of the UE. The UE may then provide an identifier identifying a particular hardware and/or software implementation. The eNB may then look up the associated capabilities that can be inferred from this combination of hardware and/or software, for instance UE RF capabilities.

The identifier may be referred to as a UE component identifier or a mobile device component identifier, where the term "component" refers to at least one specified hardware or software component, or any combination. The term "component" could also be termed "part" though this should not be used to suggest that the invention is limited to the identifiers covering only hardware. The terms UE part identifier or UE part ID are also used synonymously in this document. Furthermore, the term "mobile device component identifier may also be used as the present invention is not restricted to implementation in an LTE network. Each UE component identifier may cover one or more component of the UE. The UE component identifier, or a group of UE component identifiers, is provided to the network, for instance during initial attachment to the network, or at any point in response to a request for UE E-UTRA capability information, as will be described below in connection with FIG. 2. Specifically, the UE component identifier may be provided to the base station (the eNB). The eNB may then look up the UE component identifier in a lookup table or database that may be locally stored or stored anywhere within the network (or externally) and thereby obtain the UE capabilities associated with that UE component identifier. The UE component identifier may be provided alongside other conventional portions of UE capability information.

Taking the example where a UE component identifier indicates an RF hardware module, it is noted that the number of RF hardware vendors is relatively limited, but each vendor may provide a number of different versions of the RF hardware module, for instance to address different markets. According to one embodiment of the invention, the eNB may store the associated capabilities of a large number, for instance well in excess of 1000, of the most common UE RF hardware modules used by UEs in the network. While this comprises a storage requirement for the eNB, it is noted that the eNBs currently store the UE capabilities of a large number of connected mode UEs. If a large percentage of these use the same RF hardware module for which the eNB stores the associated capabilities, the required storage capacity may actually be reduced in accordance with the present invention compared with the current storage requirements for eNBs.

Figure 2:
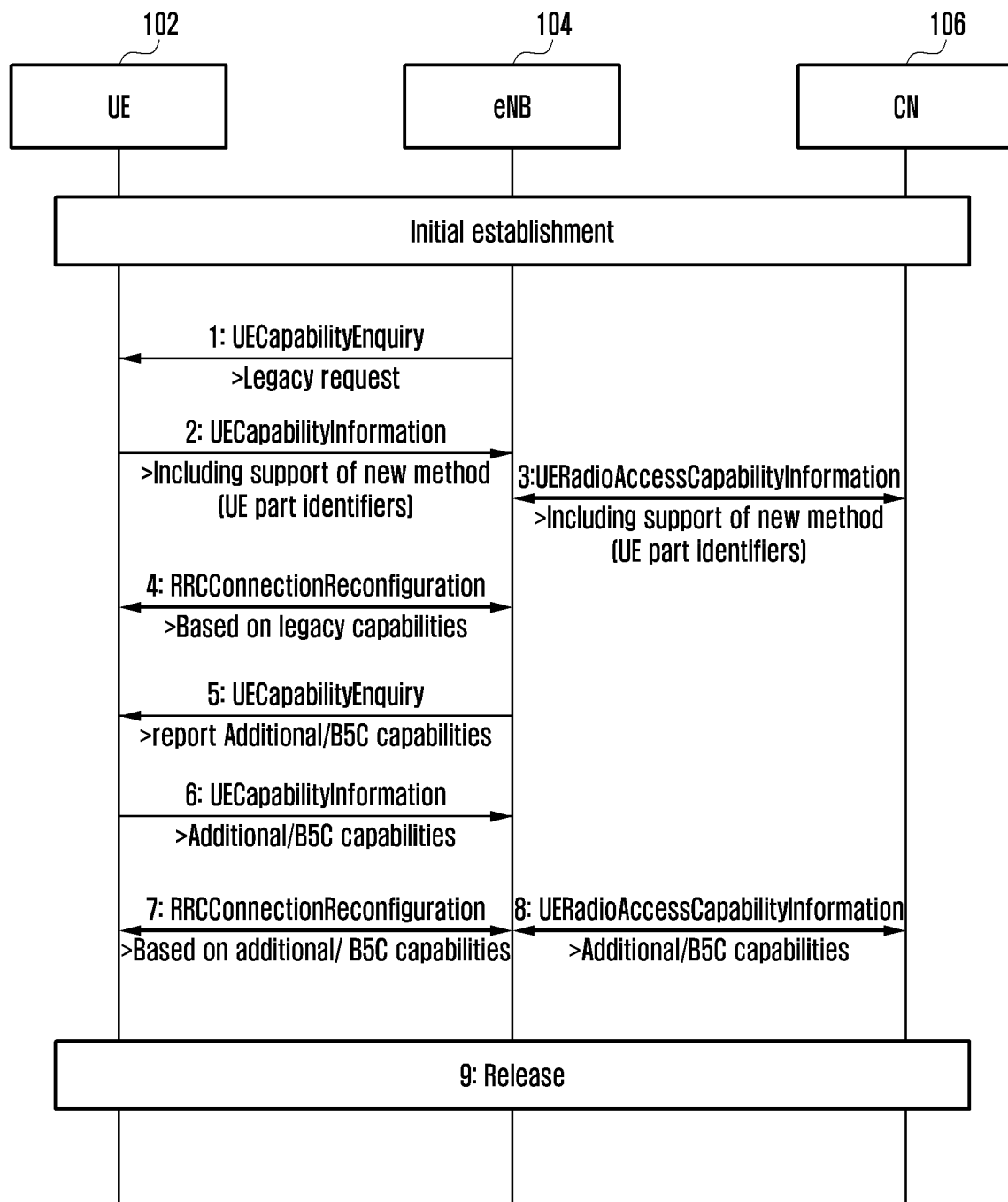
FIG. 2 illustrates a message sequence diagram for providing a UE component identifier according to a first embodiment off the present invention.

Referring now to FIG. 2, this illustrates the overall message sequence for a UE initially attaching to a network, in which the UE E-EUTRA capabilities are uploaded to the CN. Other suitable times at which UE E-UTRA capabilities are transmitted to the eNB include when the eNB requires further information about other RAT capabilities or further LTE capabilities.

FIG. 2 illustrates a two-step approach in which the UE provides the UE component identifier(s) in response to a second UE capability information request from the network after a generally conventional enquiry and response for regular capability information in which the UE informs the eNB that it supports the new mechanism of reporting a UE component identifier. However, in accordance with other embodiments of the invention (described below) the UE may provide the UE component identifier(s) in a one-step process in which they are sent in response to a first request for UE E-UTRA capabilities or only then if the UE knows that the network supports the UE component identifiers mechanism, for instance by this network support having been broadcast or signalled in a specific message. The two-step process illustrated in FIG. 2 will be described first and then one-step processes described later on.

Where, in accordance with certain embodiments of the invention, there are differences from a conventional network attach procedure, these are noted. At a subsequent connection establishment, the core network, CN, provides the UE capabilities and, provided that the lookup table in the eNB covers the particular UE component identifier for hardware or software features of the UE, connection proceeds as usual.

At point 200 the UE 102, the eNB 104 and the CN 106 commences an initial establishment procedure in which the UE attaches to the network.

Message 201 comprises a UECapabilityEnquiry message transmitted from the eNB to the UE. The UECapabilityEnquiry message 201 corresponds to the same message sent according to the current procedure in the prior art and allows the eNB to request UE capabilities. The UECapabilityEnquiry message is specified in 3GPP TS 36.331, section 6.2.2.

In accordance with the conventional procedure, in reply to the UECapabilityEnquiry message 201 the UE sends a UECapabilityInformation message 202 reporting only the regular UE E-UTRA capabilities, but will not report additional capabilities, for CA band combinations beyond 5 carriers. In accordance with an embodiment of the present invention, in UECapabilityInformation message 202 the UE also indicates that it supports the mechanisms associated with the UE component identifier by inclusion of a reportUE-PartIdentifier field (which may also be referred to as reportIdentity field) indicating that the UE supports the mechanism for reporting one or more UE component identifiers. The reportUE-PartIdentifier field may be included within a UE-EUTRA-Capability IE specified by section 6.3.6 of 3GPP TS 36.331 and as modified in accordance with the present invention. This, for certain embodiments of the present invention, may be the only modification to message 202.

Message 203 comprises a UERadioAccessCapabilityInformation message in which the eNB 104 uploads the legacy UE capabilities to the MME 114 within the CN 106, as is conventional during an initial establishment procedure. The only difference in accordance with the present invention is that an additional bit may be included indicating whether the UE supports the new UE component identifier mechanism, as reported by the UE in the reportUE-PartIdentifier field in the UECapabilityInformation message 202. The UE E-UTRA capabilities are uploaded to the MME 114 to facilitate subsequent connection establishment at any eNB.

At point 204 a conventional RRCConnectionReconfiguration process is undertaken based on the legacy capabilities. The E-UTRAN configures the UE based on the capabilities as exchanged provided in message 202 and in accordance with certain embodiments of the present invention there is no modification to the convention RRC connection reconfiguration process.

As the UE indicated in message 202 that it supports the present invention, the E-UTRAN requests the UE to provide the one or more UE component identifiers by sending a UECapabilityEnquiry message 205. This request may cover additional UE capability information beyond that indicated by the legacy capabilities provided in message 202, for instance B5C capabilities. The E-UTRAN may also indicate what the UE should still include in the legacy capability fields as described above in connection with message 201.

Referring to FIG. 3, the structure of a modified UECapabilityEnquiry message 205 is shown. The UECapabilityEnquiry message 205 includes a number of existing fields in accordance with 3GPP TS 36.331, section 6.2.2 (and which therefore are also included in UECapabilityEnquiry message 201) including ue-CapabilityRequest which provides a list of the RATs for which the eNB requests the UE to transfer the UE radio access capabilities as part of the UE E-UTRA capabilities, for instance E-UTRA, UTRA, GERAN-CS, GERAN-PS, CDMA2000. The field requestedFrequencyBands comprises a list of frequency bands for which the UE is requested to provide supported CA band combinations and non-CA bands.

In accordance with an embodiment of the present invention the UECapabilityEnquiry message 205 includes a further part indicated by point 300 in FIG. 3 which includes a further field reportUE-PartIdentifier (which may also be referred to as reportIdentity). The reportUE-PartIdentifier indicates that the UE, when reporting E-UTRA capabilities, should report one or more UE component identifiers. The reportUE-PartIdentifier field may also indicate which capabilities the UE shall in such a case still include in the corresponding legacy fields, for instance none, CA band combinations including up to 2 downlink and 1 uplink carriers, which are included in the UECapabilityInformation message 206 described below.

In response, the UE provides the one or more UE component identifiers within a further UECapabilityInformation message 206. The UECapabilityInformation message is specified in TS 36.331, section 6.2.2. Referring to FIG. 4, the structure of a modified UECapabilityInformation message is shown. The UECapabilityInformation message incorporates the UE-EUTRA-Capability IE as indicated at point 400. Details of the unchanged IE UE-CapabilityRAT-ContainerList are not shown. The UE-EUTRA-Capability IE specified by section 6.3.6 of 3GPP TS 36.331, and as modified in accordance with the present invention, is shown in FIG. 5, including a further part indicated by point 500 in accordance with an embodiment of the present invention.

Figure 5B:
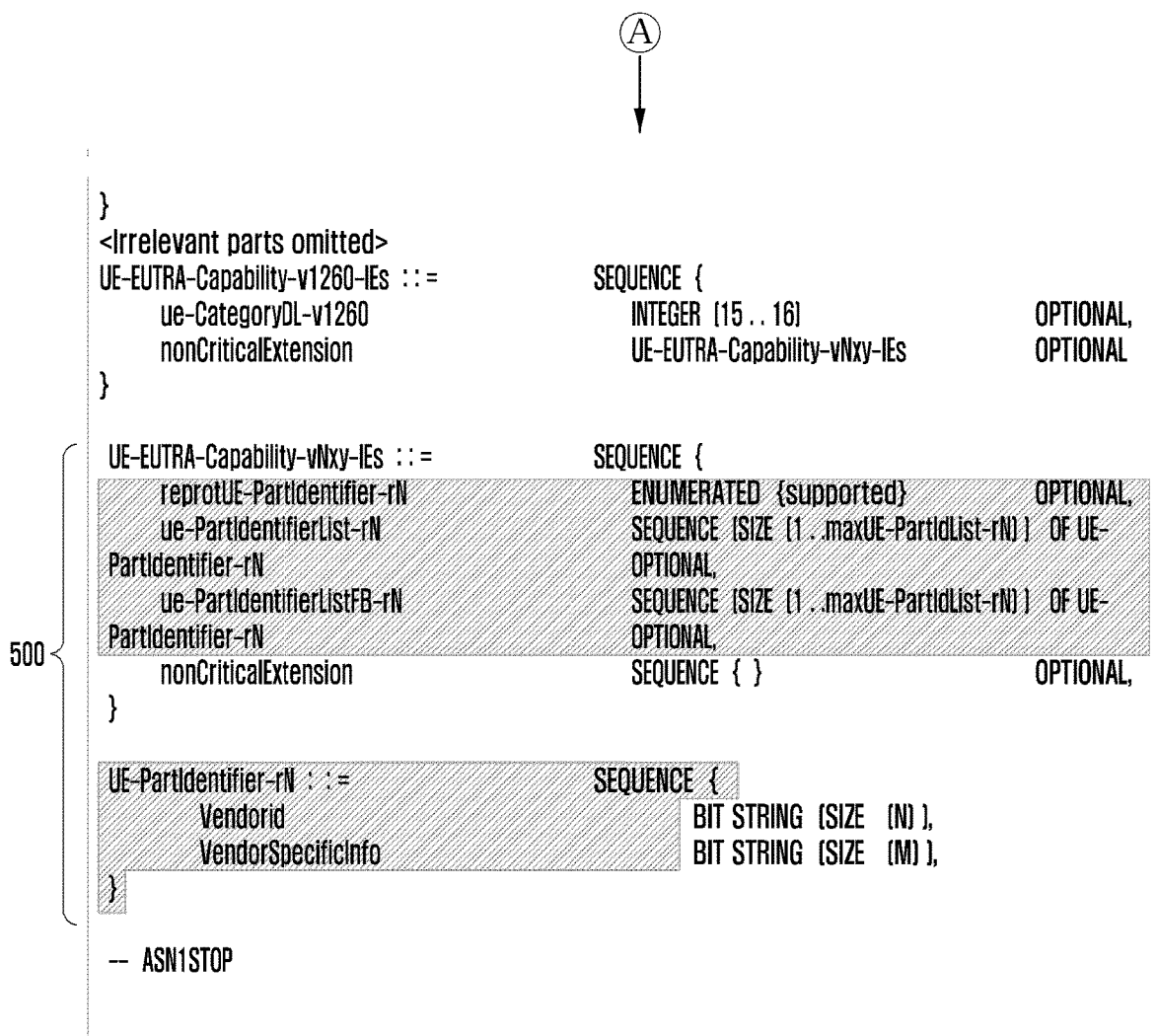

Referring to FIG. 5, in accordance with certain embodiments of the invention the UE-EUTRA-Capability IE includes a series of further fields. The field reportUE-PartIdentifier (which may also be referred to as reportIdentity) indicates that the UE supports the mechanism of reporting one or more UE part identities. The field ue-PartIdentifierList (which may also be referred to as ue- PartIdentity) comprises a list of the one or more UE component identifiers. The field ue-PartIdentifierListFB (which may also be referred to as ue-PartIdentityFB) comprises a list of one or more UE component identifiers to be used as a fall back for a situation in which the eNB does not recognize or have stored UE E-UTRA capabilities for the UE component identifiers within ue-PartIdentity. Alternatively, the fallback UE component identifiers could be included in the regular list of UE component identifiers, listed in order with e.g. the preferred identifier (representing most capabilities) first. The individual UE component identifiers are shown in FIG. 5 as UE-PartIdentifier and comprise a vendorID and a vendorSpecificInfo as will be described further below. Finally, the UE-EUTRA-Capability IE includes legacy capability fields. Fewer capabilities may be included, as these are now represented by the one or more UE component identifiers. The legacy capability fields may be set in accordance with the reportIdentity in the UECapabilityEnquiry message 205 (that is, the UECapabilityEnquiry message 205 may indicate what legacy capabilities still be included to accommodate legacy eNBs that do not operate according to the present invention).

In contrast, the earlier UECapabilityInformation message 202 may not include the ue-PartIdentifierList and the ue-PartIdentifierListFB fields. At message 202 in accordance with embodiments of the present invention only the UE support for the UE component identifier mechanism is reported, through the reportUE-PartIdentifier field.

As noted above, and described in further detail below, the UE may also include one or more UE component identifiers to be used in case the primary UE component identifiers are unknown to the eNB to serve as fall back positions, by supplying the ue-PartIdentityFB field. Furthermore, the UE may again include in the legacy capability fields within message 206 some minimum set of essential capabilities, for instance the CA capabilities up to 2 downlink and 1 uplink. The UE, as is conventional, signals the complete capabilities in a single message so that the network is not required to accumulate messages to know the full capabilities, hence the duplication of previously reported capabilities. This allows the eNB to transparently forward information without having to comprehend the content.

Upon receiving the one or more UE component identifiers, the E-UTRAN checks a lookup table or database and extracts the associated (additional) UE E-UTRA capabilities. Subsequently, E-UTRAN reconfigures the UE, taking these additional capabilities reported by the UE into account as part of a further RRCConnectionReconfiguration process at point 207.

The E-UTRAN also uploads the capabilities to the MME 114 through a UERadioAccessCapabilityInformation message 208. The eNB may transparently forward information received from the UE, including any new information related to the present invention (in particular, the UE component identifiers). Alternatively, the eNB may modify the contents of the UE capabilities received from UE before forwarding to MME. Specifically, the eNB may include the full capabilities corresponding to the UE component identifiers it has obtained from the lookup table or database.

Point 209 indicates connection release of the UE from the eNB in which the stored values for the UE component identifiers, and the legacy UE E-EUTRA capabilities are erased from the eNB. At connection release, the eNB erases all information it has stored about the UE (referred to as UE context). The lookup tables are not for a specific UE and hence may be retained by the eNB.

It will be appreciated that situation in which the UE does not support the UE component identifier mechanism must be considered. As noted above, the UECapabilityEnquiry message 205 includes a reportUE-PartIdentifier field allowing the receiving UE to indicate their support. However, this is only included in response to the eNB being notified that the UE supports the mechanism, according to the two-step option described in connection with FIG. 2. In general, for UE capabilities in accordance with the current initial attachment procedure, the E-UTRAN can request the UE to report capabilities, not knowing whether the UE supports the function related to those capabilities, for instance the E-EUTRAN does not need to have prior knowledge of whether a UE supports a particular RAT. For UE capability retrieval in general it is not the case that the E-UTRAN can only configure the UE to do something it supports. However, it is currently the case that for the retrieval of UE capabilities for frequency bands specifically requested by E-UTRAN, there is a specific associated UE capability. For this situation the E-UTRAN must first know whether the UE supports the functionality of reporting frequency bands specifically requested, and so it can only retrieve this UE capability information after the initial UE capability retrieval procedure at messages 201 and 202 has been completed. It is currently the case that the reporting of legacy band combinations (band combinations up to 2 downlink and 1 uplink bands) is not changed: the requestedFrequencyBands field only affects the prioritization of which band combinations may be included in legacy fields. Even if reporting of legacy band combinations was affected, the UE only does this when requested: that is, when the E-UTRAN indicates it wants the UE to report according to the requestedFrequencyBands field.

As for UE capabilities information other than for frequency bands specifically requested by E-UTRAN, the EUTRAN may request the UE to report UE component identifiers without knowing whether the UE supports reporting of such identifiers. That is, if in accordance with the present invention the E-UTRAN sends the UE a reportUE-PartIdentifier field, which the UE does not understand, then this is simply ignored. This means, it may be possible to apply alternatives other than the two step approach outlined in the previous discussion.

The present invention affects neither the Si (between the eNB 104 and the MME 114) nor the X2 interface (between eNBs). As noted above, the information that is reported to the MME 114 does include either the specific UE component identifiers or the corresponding UE E-UTRA capabilities; however this does not affect the functioning of the interface. Similarly, the contents of the UE capability fields transferred within a number of inter-node messages, for instance the HandoverPreparationInformation message field ue-RadioAccessCapabilityInfo, is modified to include a list with each entry containing the capabilities of a RAT supported by the UE within an octet string. Also, the SCG-ConfigInfo message field eutra-CapabilityInfo containing the LTE capabilities, within an octet string and the UERadioAccessCapabilityInformation message field ue-RadioAccessCapabilityInfo containing the Uu message UECapabilityInformation, again within an octet string are modified to include the UE component identifiers or the corresponding UE E-EUTRA capabilities.

The main changes in UE behaviour as a result of embodiments of the present invention following a two-step approach are as follows:

Whenever providing the legacy UE E-UTRA capabilities (LTE capabilities), the UE further indicates that it support the UE component identifier functionality (message 202).

When requested to provide LTE capabilities using the UE part identity approach (through the UECapabilityEnquiry message 205), the UE includes the one or more UE component identifiers within the UECapabilityInformation message 206. According to certain embodiments, the UE might also include one or more UE component identifiers to be used as fall back positions, for instance if the eNB is unable to determine the capabilities associated with a primary UE component identifier.

Furthermore, in accordance with the present invention, the UE may omit the legacy capabilities corresponding to the transmitted UE component identifiers within UECapabilityInformation message 206. In accordance with some embodiments of the invention there may be some exceptions, and certain capability information may be included alongside a UE component identifier that is associated with the same capability information, resulting in some duplication. The circumstances in which duplicated capability information is provided are discussed in greater detail below. For instance, the UE may still include some minimal or essential capabilities in the legacy capability fields, for instance relating to UE support for CA up to 2 downlink and 1 uplink band combinations. The capabilities that the UE still includes may depend on the reportUE-PartIdentifier field within the UECapabilityEnquiry message 205 that the E-UTRAN includes when requesting the UE to provide its capabilities.

The main changes in eNB behaviour as a result of embodiments of the present invention following a two-step approach are as follows:

For a UE that indicates support for the UE part identity functionality, the eNB may initiate retrieval of one or more UE component identifiers (in order to become aware of the full functionality supported by the UE). Within the request, the eNB may indicate which capabilities associated with or covered by the one or more UE component identifiers are still to be included explicitly in legacy capabilities.

When the UE reports the one or more UE component identifiers, the eNB verifies whether it has stored (or has external access to) the associated UE capabilities corresponding to each of these identifiers. If this is not the case, the eNB may initiate a procedure to obtain the associated capabilities. This procedure may either comprise an internal network procedure (for instance, requesting the capabilities from a database connected to the network) or by retrieving the missing capability information from the UE by means of a further UECapabilityEnquiry message (with the reportUE-PartIdentifier field indicating that the UE should report all capabilities alongside the UE component identifier).

The eNB may apply lookup table or database management functionality. As noted above, while not envisaged to represent a significant eNB storage burden, it is preferable to seek to constrain the volume of UE component identifier information and corresponding LTE capabilities that is stored. This may be achieved by aiming to ensure, for instance, the 1000 most used UE component identifiers are stored while other less popular UE component identifiers are removed. As one example of a suitable garbage collection mechanism, the popularity of each UE component identifier may be assessed, for instance by registering how many times the information for each UE part identity is retrieved.

After having determined capabilities associated with the one or more UE part identities, the eNB may take these additional capabilities (beyond the legacy/B5C CA capabilities) into account, for instance by configuring more component carriers during the RRCConnectionReconfiguration process at point 207 of FIG. 2.

For a UE component identifier that the eNB does not recognize, or is unable to determine the associated capabilities, the eNB may apply fall back capabilities. This could be the mandatory capabilities of the access stratum release supported by the UE or the minimum capabilities of the UE indicated by the legacy capability fields. For a situation in which the UE has included one or more UE component identifiers to be used as fall back, the eNB may try to determine the capabilities associated with these UE component identifiers. In certain cases this may involve seeking to determine the capabilities associated with these UE component identifiers in order, for instance the order listed within the UECapabilityEnquiry message 205 or in order of most preferred by the UE or most similar to the primary (unrecognised or unmatched) UE component identifier.

When providing the UE capabilities across network interfaces, the eNB may either forward the capability information exactly as received from the UE (that is, with the UE component identifier unchanged and with zero or minimal information within the legacy fields). Alternatively, the eNB may retrieve the full capabilities from the UE (at a convenient time, and possibly in parts), so it can still transparently forward the information. As a further alternative, the eNB may modify the capabilities received from the UE by inserting the capabilities associated with the UE component identifier (as determined from the eNB lookup table). It should be noted that storage capacity is an issue for CN, and specifically the MME, also. Moreover, in some situations it may acceptable for a UE to temporarily use reduced capabilities following connection establishment or inter radio node mobility. Consequently, in certain embodiments, the transfer of the UE component identifiers instead of the full capabilities may be the preferred option.

As noted above, FIG. 2 comprises a two-step option for providing UE component identifiers. However, in accordance with other embodiments of the invention, now to be described in connection with FIGS. 6 to 8, the UE may provide the UE component identifier(s) in a one-step process. In particular, according to a first one-step option, the UE may always provide the UE component identifier in response to a request for UE E-UTRA capability information (to be described below in connection with FIG. 6). A second one-step option is that the UE provides the UE component identifier in response to a request for UE E-UTRA capability information only if network indicates support for the present invention through a broadcast message (to be described below in connection with FIG. 7). A third one-step option is that the UE provides the UE component identifier in response to a request for UE E-UTRA capability information only if the network explicitly requests the provision of the UE component identifier in the request for UE E-UTRA capability information (to be described below in connection with FIG. 8).

Where the messages within the one-step options are the same or similar to those of the two-step option illustrated in FIG. 2 then this is noted.

Figure 6:
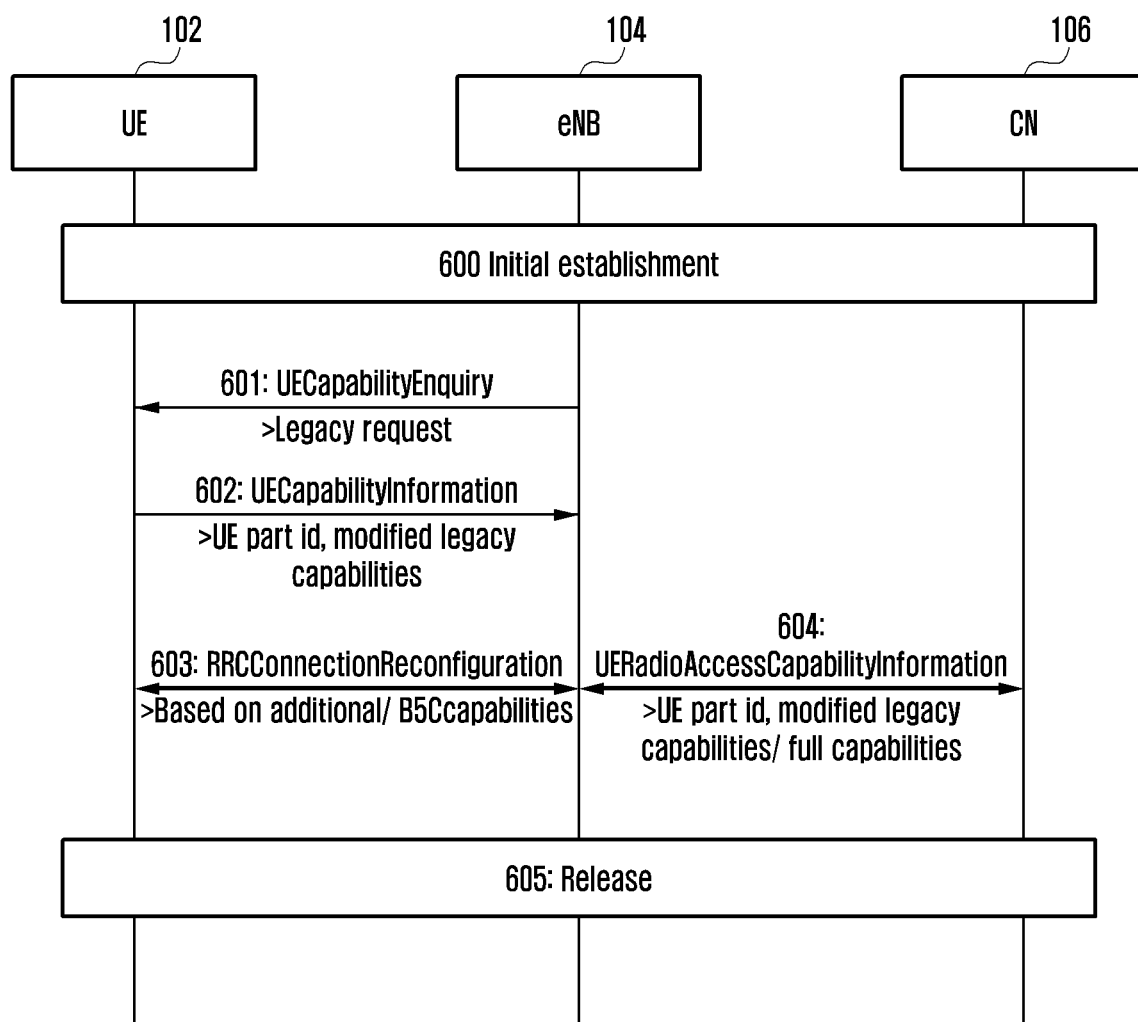
FIG. 6 illustrates a message sequence diagram for providing a UE component identifier according to a second embodiment off the present invention.

With reference to FIG. 6, a first one-step process will now be described in which the UE always provides one or more UE component identifiers in response to a UECapabilityEnquiry message and there is no network configuration. The respective portions of the 3GPP standards as modified in accordance with the present invention may specify what capability information the UE shall include in legacy fields. Step 600, the initiation of the initial establishment procedure is the same as step 200 in FIG. 2. At step 601 the eNB sends a UECapabilityEnquiry message requesting UE capabilities according to the current specifications, and the same as described above in connection with message 201. In response, the UE sends a UECapabilityInformation message 602 which includes the one or more UE part identifiers and is the same as described above in connection with message 206, though differing from FIG. 2 there is no preceding step in which the UE merely indicates support for the UE component identifier mechanism. As for message 206 (and as illustrated in FIGS. 4 and 5) the UE may also include one or more UE component identifiers to be used in case the original values are unknown, to serve as fall back positions. Furthermore, the UE may include in the legacy capability fields some minimum set of essential capabilities, for instance the CA capabilities up to 2 downlink and 1 uplink. However, if the capability information that the UE shall include is fixed in the standards then it cannot be configured by the E-UTRAN.

Upon receiving the one or more UE component identifiers, the E-UTRAN checks its lookup table and extracts the associated (additional) UE capabilities. Subsequently, the E-UTRAN reconfigures the UE, taking these additional capabilities reported by the UE into account through an RRCConnectionReconfiguration process 603, which corresponds to the reconfiguration process 207.

The E-UTRAN also uploads the capabilities to MME in the UERadioAccessCapabilityInformation message 604, which corresponds to message 208. Although there are no changes to network interfaces or to the MME, the EUTRAN either transparently forwards the capability information received from UE (now including the one or more UE component identifiers), or it includes the full capabilities corresponding to or closest to the UE component identifier(s).

Figure 7:
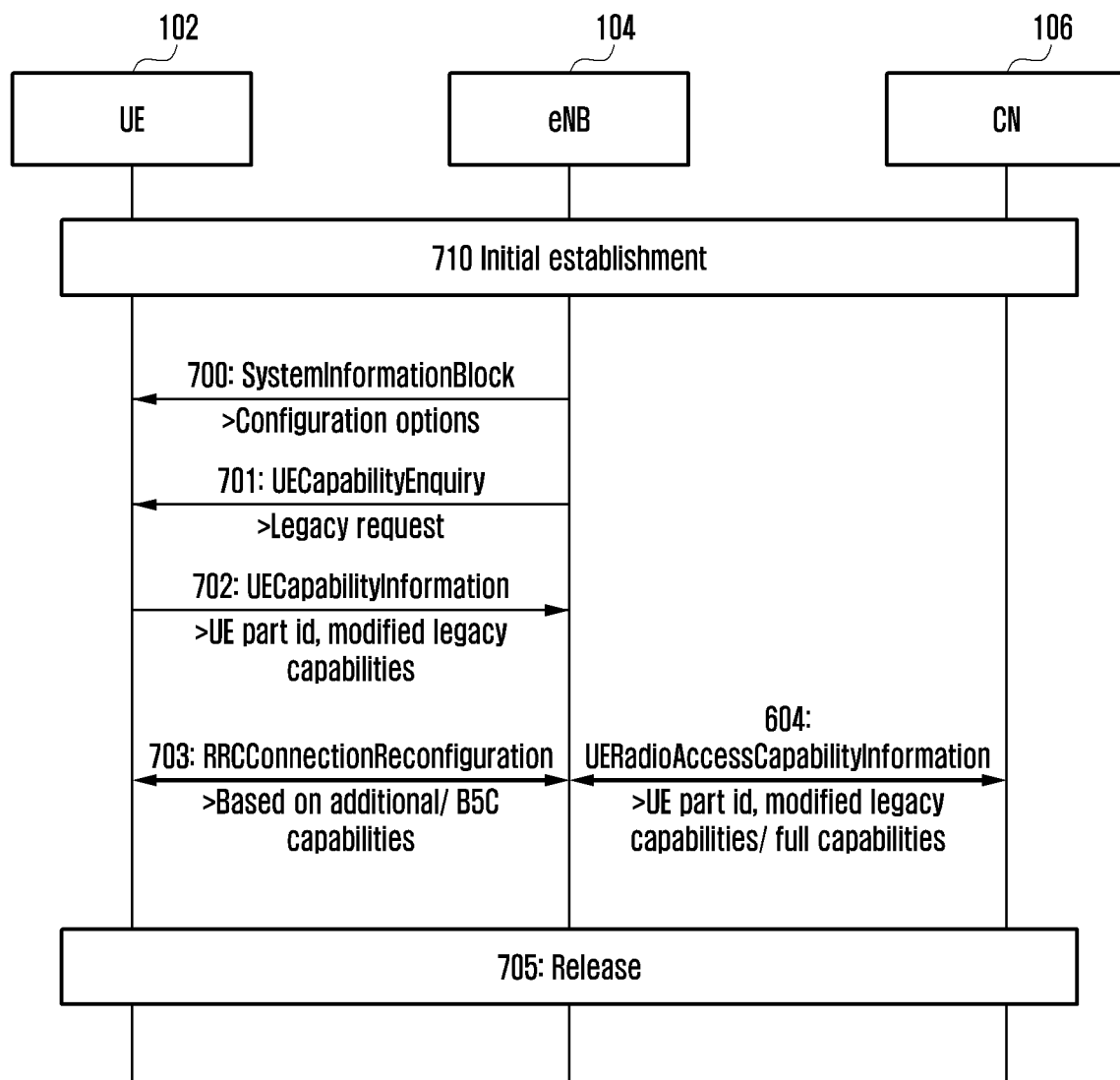
FIG. 7 illustrates a message sequence diagram for providing a UE component identifier according to a third embodiment off the present invention.

With reference to FIG. 7, a second one-step process will now be described in which the network provides configuration information by means of broadcast signalling. The broadcast signalling indicates whether the UE should provide UE component identifiers in response to a UECapabilityEnquiry messages. The broadcast signalling may also indicate what to include in legacy fields. The UE takes this broadcast information into account when providing UE capability information.

The EUTRAN provides configuration information by broadcast signalling to the UE within a SystemInformationBlock message 700. This may include whether UE should provide the one or more UE component identifiers as well as what the UE should still include in the legacy capability fields UE capabilities according to current specifications (i.e. no changes). The configuration information signalled in the SystemInformationBlock message 700 is similar to that within the field reportUE-PartIdentifier within UECapabilityEnquiry message 205 in the two step approach described in the previous section. The subsequent steps of FIG. 7 correspond to those of FIG. 6, except that when providing the UE capability information in step 2 the UE now takes into account the configuration information provided in step 0 before deciding to including one or more UE component identifiers.

Figure 8:
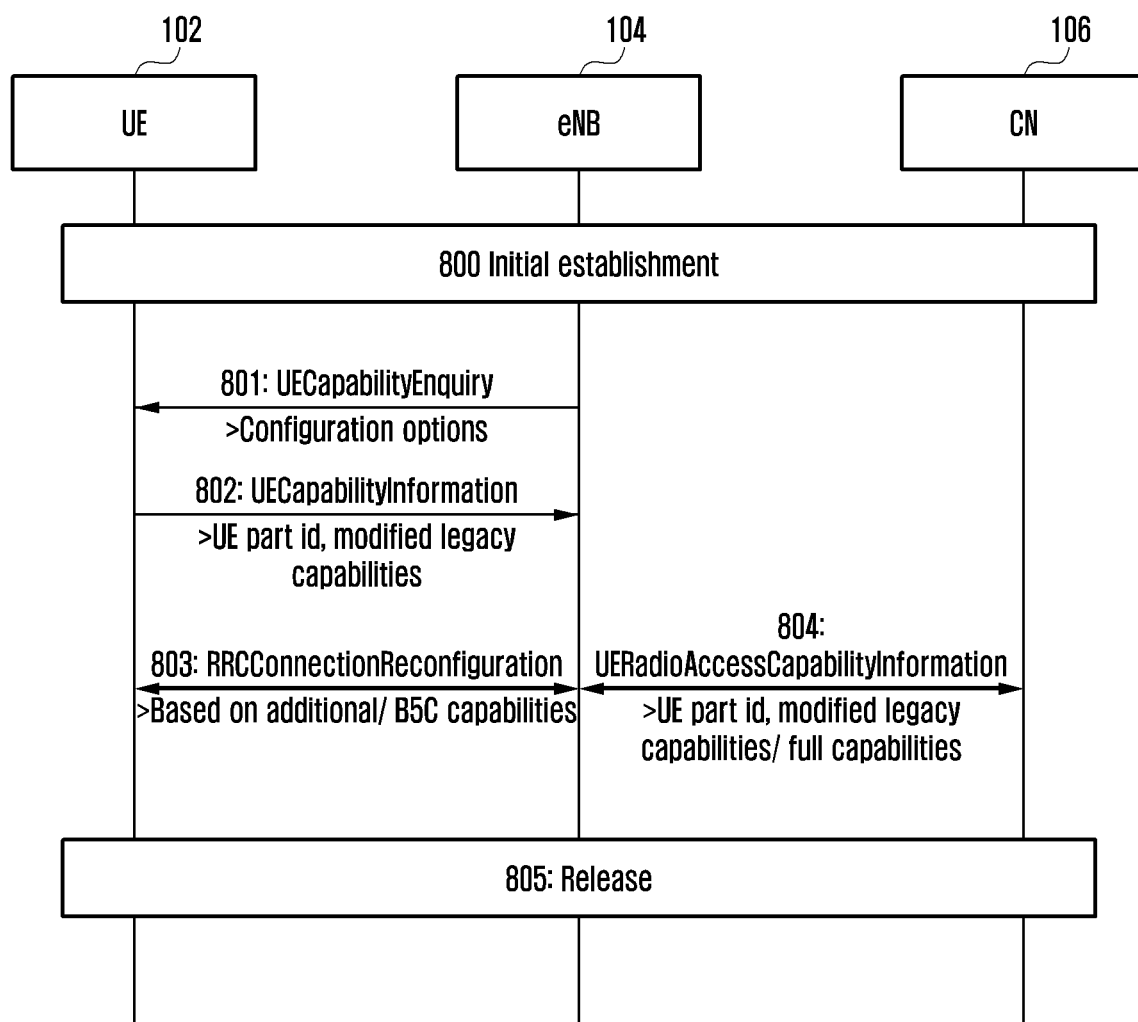
FIG. 8 illustrates a message sequence diagram for providing a UE component identifier according to a fourth embodiment off the present invention.

With reference to FIG. 8, a third one-step process will now be described in which the network provides configuration information by means of dedicated signalling to indicate to the UE whether the UE should provide UE component identifiers, and optionally what to include in legacy fields. The UE takes this configuration information into account when providing UE capability information.

FIG. 8 differs from FIG. 6 only in that within UECapabilityEnquiry message 801 the EUTRAN provides configuration information. The EUTRAN provides the configuration information without knowing whether the UE supports the signalling of UE component identifiers. The configuration information again may include whether UE should provide the one or more UE component identifiers as well as what the UE should still include in the legacy capability fields.

Within the UECapabilityInformation message 802 the UE takes into account the configuration information provided in step 801. The structure of a UE component identifier according to an embodiment of the present invention will now be described. The field uniquely identifying the or each UE part (that is one or more hardware or software components) may comprise a subfield identifying the vendor and a further subfield that can be left up to the vendor, as shown in the following Table 1:

Table 1

TABLE 1

| Vendor ID | Vendor specific information |
|-----------|----------------------------|
| N bits    | M bits                      |

Example of the high level information structure of a UE component identifier.

Advantageously, structuring the UE component identifier may assist in identifying or prioritising suitable fall back UE component identifiers in the event that the eNB is unable to identify or retrieve the corresponding LTE capabilities for a primary UE component identifier. For example, knowledge of the way in which a vendor structures the vendor specific information may allow the eNB to determine a UE component identifier which it does recognise with a more minimal but similar set of associated LTE capabilities which may be used instead.

While the present invention allows for a reduction in LTE capability data transmitted between the UE and the eNB (and stored at the eNB) for compatible devices, as noted above according to certain embodiments it is necessary to ensure backwards compatibility, particularly for legacy eNBs. In particular, backwards compatibility requires consideration of how to accommodate the information required by legacy eNBs which has been replaced by the UE component identifier. According to certain embodiments of the present invention, and as briefly noted above, the UE may still provide certain legacy capability fields corresponding to LTE capability information covered by a UE component identifier (within UECapabilityInformation message 206) when providing the UE component identifier. The extent of this duplicated legacy information varies according to differing embodiments of the invention, this may include providing the following legacy field information:

None—that is, no LTE capability information associated with a transmitted UE component identifier is transmitted within UECapabilityInformation message 206.

The same minimum amount of LTE capability information as currently specified when the E-UTRAN requests UE capabilities (for specific bands): in LTE the network is able to limit the band combination signalling provided by the UE by requesting it to only provide information regarding specific bands (requested bands). In such a case the UE still indicates LTE capability information for all non-CA bands as well as all 2 downlink and 1 uplink CA band combinations (thereby prioritising the CA combinations requested).

The full LTE capabilities associated with the concerned UE component identifier may be transmitted. However, it should be noted that this third option concerns a case in which the EUTRAN wishes to retrieve the full capabilities from the UE when its lookup table does not include an entry for the concerned UE component identifier and a separate UECapabilityRequest message requesting the full capabilities is transmitted to the UE.

In case some nodes in the network do not support the new mechanism, according to certain embodiments there may be a larger need for the UE to include more legacy fields. According to certain embodiments of the present invention, beneficially the E-UTRAN can configure what legacy capability information the UE should signal alongside a UE component identifier. Possible options include:

None.

The minimum amount of LTE capability information noted above.

All CA combinations that are not beyond 5 component carriers (that are not B5C).

The full LTE capabilities

According to certain embodiments of the present invention, the configuration of the UE component identifier lookup table at the eNB, that is, the table that defines the associated UE capabilities corresponding to each UE component identifier may be left up to the manufacturers of eNB equipment. However, there remains the question what to do if the UE reports the identity of a UE part for which the associated capabilities are not included in the lookup table stored by the eNB. This situation may occur even though as discussed above the storage requirements at the eNB for UE component identifiers is not considered to be excessive, the stored UE component identifiers may not be comprehensive. According to various embodiments of the present invention, one of the following options may be followed:

Apply a fall back capability, for instance the capabilities indicated by legacy fields.

Apply a fall back capability, based on one or more additional UE component identifiers supplied by the UE alongside a primary UE component identifier, as discussed above in connection with step 206 of FIG. 2 and FIG. 5. Multiple fall back UE component identifiers may be provided representing multiple fall back capabilities (listed in order of decreasing capabilities: a smaller subset).

This scenario of an unknown UE component identifier may be accommodated based on knowledge of how a particular vendor uses the vendor specific bits of a UE component identifier.

Issue a request to retrieve the full capabilities from the UE.

Issue a network internal procedure to retrieve the full capabilities from elsewhere within the LTE network or from an external source.

According to certain embodiments of the present invention, support for inter-eNB handover is provided. If the handover is to another eNB supporting the UE component identifier mechanism then the UE component identifier may simply be provided. If however the handover is to another eNB not supporting the UE component identifier mechanism, or is likely not to know the UE component identifier then there are a number of options that may be followed for the source eNB:

No special action—the eNB merely forwards the capability information received from the UE.

The eNB retrieves the full capabilities from the UE prior to handover.

The eNB modifies the capabilities received from the UE by inserting the capabilities associated with the UE component identifier (the source eNB generates a full set capabilities based upon its lookup table).

In case of the first option the target eNB would initially use a fall back capability: for instance the capabilities indicated by legacy fields (also transmitted as part of the handover), while any further action is left up to the target eNB also. The UE capabilities may be placed in a container that is transparently transferred by the E-UTRAN. The second option maintains this principle, but at the cost of additional signalling overhead. According to the second or third option the UE component handover may also be included, which advantageously allows the target eNB to update the UE component identifier and the associated UE E-UTRA capabilities to its lookup table (if the target eNB implements the invention but is not expected to know the particular UE component identifier).

The UE E-UTRA capabilities are not only exchanged between eNBs, they are also stored by the MME. Furthermore, these capabilities may be exchanged with nodes using other Radio Access Technologies (that is, inter-RAT). According to certain embodiments of the present invention, the behaviour of the MME in such a scenario is considered, specifically what the MME should store and what should be exchanged with other RATs. In principle the same options apply as for the inter-eNB handover case, that is, to transfer: a) only the UE component identifier, with any fall back options indicated for instance by additional UE component identifiers or by legacy fields, b) the full capabilities associated with the UE component identifier, either generated by UE or by eNB, or c) both. In this respect it should be noted that network nodes never combine UE capability information exchanged at different times: it is always assumed that the information received concerns the complete up to date UE capabilities.

As discussed above, it has been proposed that upon handover from UMTS the eNB should be able to start the E-UTRA connection even without being provided with any UE capabilities. Correspondingly it is acceptable for inter RAT nodes to merely provide the UE component identifier. The eNB may temporarily, following connection establishment or handover, not use the full UE capabilities. In other words, the same options apply as for MME and identified in the paragraph above.

It will be appreciated that embodiments of the present invention can be realized in the form of hardware, software or a combination of hardware and software. Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for operating a mobile device in a mobile communication network, the method comprising:
   receiving a request from a network node for capability information;
   transmitting mobile device capability information including a mobile device component identifier field to the network node within the mobile communication network, wherein the mobile device component identifier field indicates that the mobile device can transmit at least one mobile device component identifier;
   receiving from the network node a request for additional capability information; and
   transmitting additional mobile device capability information including the at least one mobile device component identifier to the network node in response to the request for the additional capability information,
   wherein the at least one mobile device component identifier identifies at least one hardware or software component of the mobile device, and
   wherein the at least one mobile device component identifier is indicative of capability information specifying at least one capability of the mobile device for communication with the mobile communication network.

2. The method of claim 1, further comprising:
   communicating with the network node to configure a wireless connection between the mobile device and the network node according to mobile device capability information indicated by the at least one mobile device component identifier,
   wherein the at least one mobile device component identifier comprises a first subfield identifying a vendor associated with the hardware or software component of the mobile device or the mobile device itself and a second subfield identifying a particular hardware or software component of the mobile device, and
   wherein the mobile device supplies the at least one mobile device component identifier to the network node during attachment to the mobile communication network.

3. The method of claim 1, further comprising:
   receiving an indication from the network node regarding a proportion of capability information indicated by the at least one mobile device component identifier to be transmitted to the network node along with the at least one mobile device component identifier; and
   transmitting, to the network node, along with the at least one mobile device component identifier, one of:
      no capability information indicated by the at least one mobile device component identifier,
      a subset of the capability information indicated by the at least one mobile device component identifier,
      capability information for carrier aggregation, CA, only for band combinations of less than a predetermined number of bands, or
      all of the capability information indicated by the at least one mobile device component identifier.

4. The method of claim 1, further comprising:
   wherein an additional mobile device component identifier identifies at least one alternative hardware or software component of a mobile device, and
   wherein the additional mobile device component identifier is indicative of capability information specifying at least one alternative capability of the mobile device different from that specified by the capability information indicated by a first mobile device component identifier for communication with the mobile communication network.

5. A method for operating a network node in a mobile communication network, the method comprising:
   transmitting, to a mobile device, a request for capability information after initial establishment with the mobile device;
   receiving, from the mobile device, mobile device capability information including a mobile device component identifier field, wherein the mobile device component identifier field indicates that the mobile device can transmit at least one mobile device component identifier;
   checking a stored database of mobile device component identifiers to determine if the at least one mobile device component identifier is stored, and if so obtaining from a database capability information indicated by the at least one mobile device component identifier specifying at least one capability of the mobile device for communication with the mobile communication network;
   transmitting, to the mobile device, a request for additional capability information; and
   receiving, from the mobile device, additional mobile device capability information including the at least one mobile device component identifier, wherein the at least one mobile device component identifier identifies at least one hardware or software component of the mobile device.

6. The method of claim 5, further comprising:
transmitting mobile device capability information including the at least one mobile device component identifier to a core network node within the mobile communication network; and
configuring a network connection between the mobile device and the network node on a basis of the capability information indicated by the at least one mobile device component identifier.

7. The method of claim 5, wherein if the stored database of mobile device component identifiers does not include a received mobile device component identifier, the method further comprises:
configuring a network connection between the mobile device and the network node on a basis of additional capability information received from the mobile device.

8. The method of claim 5, further comprising one of:
transmitting, to another network node, the additional mobile device capability information received from the mobile device including the at least one mobile device component identifier; or
transmitting, to another network node, the additional mobile device capability information received from the mobile device, the additional mobile device capability information having been modified by a substitution of capability information obtained from a database for the at least one mobile device component identifier.

9. A mobile device in a mobile communication network, the mobile device comprising:
a transceiver; and
a controller coupled with the transceiver and configured to control to:
receive a request from a network node for capability information,
transmit mobile device capability information including a mobile device component identifier field to the network node within the mobile communication network, wherein the mobile device component identifier field indicates that the mobile device can transmit at least one mobile device component identifier,
receive from the network node a request for additional capability information, and
transmit additional mobile device capability information including the at least one mobile device component identifier to the network node in response to the request for additional capability information,
wherein the at least one mobile device component identifier identifies at least one hardware or software component of the mobile device, and
wherein the at least one mobile device component identifier is indicative of capability information specifying at least one capability of the mobile device for communication with the mobile communication network.

10. A network node in a mobile communication network, the network node comprising:
a transceiver; and
a controller coupled with the transceiver and configured to control to:
transmit a request for capability information to a mobile device after initial establishment with the mobile device,
receive from the mobile device capability information including a mobile device component identifier field, wherein the mobile device component identifier field indicates that the mobile device can transmit at least one mobile device component identifier,
check a stored database of mobile device component identifiers to determine if the at least one mobile device component identifier is stored, and if so obtaining from a database capability information indicated by the at least one mobile device component identifier specifying at least one capability of the mobile device for communication with the mobile communication network,
transmit a request for additional capability information to the mobile device, and
receive, from the mobile device, additional mobile device capability information including the at least one mobile device component identifier,
wherein the at least one mobile device component identifier identifies at least one hardware or software component of the mobile device.

11. The network node of claim 10, wherein the network node comprises a base station.

* * * * *